(12) United States Patent
Liu

(10) Patent No.: US 7,289,397 B2
(45) Date of Patent: Oct. 30, 2007

(54) METHOD AND APPARATUS FOR DETERMINING POSITION OF OPTICAL PICK-UP HEAD

(75) Inventor: Tun-Hsing Liu, Pingjhen (TW)

(73) Assignee: Mediatek Inc. (TW)

( * ) Notice: Subject to any disclaimer, the term of this patent is extended or adjusted under 35 U.S.C. 154(b) by 135 days.

(21) Appl. No.: 10/906,982

(22) Filed: Mar. 15, 2005

(65) Prior Publication Data

US 2005/0237878 A1    Oct. 27, 2005

(30) Foreign Application Priority Data

Apr. 21, 2004 (TW) .............................. 93111125 A

(51) Int. Cl.
*G11B 7/00* (2006.01)
(52) U.S. Cl. .................. 369/44.27; 369/53.29; 369/53.17; 369/30.17
(58) Field of Classification Search .......... 369/44.26, 369/44.27, 47.48, 53.22, 53.3, 47.41, 53.29, 369/275.4, 275.1, 47.37, 239, 60.01, 30.17, 369/53.37, 53.34
See application file for complete search history.

(56) References Cited

U.S. PATENT DOCUMENTS 5,790,488 A * 8/1998 Uemura .................... 369/47.41
6,111,830 A * 8/2000 DeCusatis et al. ......... 369/53.3
6,914,862 B2 * 7/2005 Tsai et al. ................. 369/47.41

FOREIGN PATENT DOCUMENTS

TW          544669           8/2003

\* cited by examiner

*Primary Examiner*—Ali Neyzari
(74) *Attorney, Agent, or Firm*—Connolly Bove Lodge & Hutz LLP

(57) ABSTRACT

A method for determining the position of a pick-up head involves retrieving the respective parameter values relating to the linear velocity and angular velocity of the pick-up head at a certain place on the optical disk, and then calculating the ratio of the parameter value of the linear velocity to the parameter value of the angular velocity. Since the ratio is linearly correlated with the distance between the pick-up head and the center of the optical disk, the absolute position of the pick-up head can be determined, as far as its whereabouts is concerned.

19 Claims, 10 Drawing Sheets

| sync | minute | | | | | | | second | | | | | | | frame | | | | | | | CRC |
|---|---|---|---|---|---|---|---|---|---|---|---|---|---|---|---|---|---|---|---|---|---|---|
| | M1 | x | x | x | x | x | x | S1 | x | x | x | x | x | x | F1 | x | x | x | x | x | x | code |

| CONTROL | ADR | TND | INDEX | S | M | F | ⋯⋯ | |
FIG. 5 (Background Art)
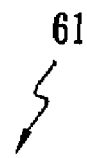
| PCA | PMA | LI | PA | LO |
← inner                    outer →
FIG. 6(a) (Background Art)
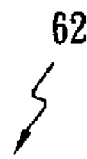
| PCA | PMA | LI | PA | LO | LI | PA | LO | ⋯ | LI | PA | LO |
← inner                    outer →
FIG. 6(b) (Background Art)

METHOD AND APPARATUS FOR DETERMINING POSITION OF OPTICAL PICK-UP HEAD

BACKGROUND OF THE INVENTION

1. Field of the Invention

The present invention relates to a method and an apparatus for determining the position of a pick-up head (PUH), more particularly to a method and an apparatus for correctly determining the current position of the pick-up head according to the velocity-related values of the pick-up head at a certain position on an optical storage medium.

2. Description of the Related Art

FIG. 1 is a schematic diagram illustrating the information area structure of a quarter of a conventional optical storage medium. At the center of an optical storage medium 10 (for example, an optical disk like the CD-R format or the CD-RW format), there is a center hole 11 for a spindle of an optical storage device to synchronously rotate with the medium 10. The information area of the optical storage medium 10 is sequentially divided into a laser power calibration area (PCA) 12, a program memory area (PMA) 13, a lead-in (LI) area 14, a program area (PA) 15 and a lead-out (LO) area 16 from its interior to its exterior.

When the mold of a recordable optical storage medium is engraved with grooves, the shallow groove starts from the center of the optical storage medium and is spirally formed thereon by means of a laser beam controlled by a predetermined program. Known as a pre-groove, the groove does not look like a smooth spiral, but instead is a spiral that wobbles in a sinusoidal waveform of tiny amplitude. A signal read from the pre-groove is hereinafter referred to as a "wobble signal." Every sector on an optical disk generally fabricated by die-casting contains time-related data for controlling the rotational speed of an optical storage device, in order to correctly read signals recorded on the optical disk.

It is necessary for a recordable optical storage device to guide the laser beam of the pick-up head to move outward in proper sequence and control its rotational speed correctly according to some means. Since the tracking and timing code information is provided by the wobbling pre-groove, such information is called ATIP (Absolute Time In Pregroove) data. With the data, the recording speed of signals can be kept constant. To record data on a recordable optical disk, the optical storage device adds the address information to the main data, and then the combined data are encoded and scrambled before the processed main data converted by Eight-to-Fourteen Modulation (hereinafter referred to as "EFM signals") are recorded on the tracks of the recordable optical disk.

Later on, to retrieve the recorded data, the optical storage device demodulates the EFM signals first and then descrambles and decodes them in order to read the main data and address information. If the EFM signals burned to an optical disk are present, the optical storage device can use such signals to make the optical pick-up head move in proper sequence and control the rotational speed of a spindle motor. On the other hand, after the signals are successfully decoded, the physical address information required for the positioning of the pick-up head can be obtained.

FIG. 2 is a diagram illustrating the scheme of ATIP data. The ATIP data comprises a 4-bit sync code, an 8-bit minute (M) code, an 8-bit second (S) code, an 8-bit frame (F) code, and a cyclic redundancy check code (CRC). ATIP time codes {MM: SS: FF} can define the absolute beginning and the absolute destination of every sub area in an information area of an optical disk and are obtained through the minute codes, second codes, and frame codes; wherein MM, SS and FF denote the minute code (0-99), second code (0-59), and frame code (0-74), respectively.

FIG. 3 is a diagram illustrating the corresponding relationship between an information area and an ATIP time code. Referring to FIG. 3, $t_1$ denotes the start time code of the laser beam power calibration area (PCA) 12, which is set to {95:00:00} in most optical disks, $t_2$ denotes the start time code of the program memory area (PMA) 13, $t_3$ denotes the start time code of the lead-in area (LI) 14, $t_4$ may preferably denote the end time code {99:59:74} of the lead-in area (LI) 14 or the start time code {00:00:00} of the program area (PA) 15, and $t_5$ denotes the last possible start time code of the lead-out area (LO) 16, for example, an 80-minute CD-R disk designates $t_5$ as {79:59:74}.

At present, it is quite common for the program area (PA) 15 of an optical disk to have a capacity greater than 95 minutes, and in consequence it is impossible to map time codes one-to-one and onto the locations of the various areas in the optical disk, as shown in FIG. 4. Obviously, an interval of the time code from {95:00:00} to {99:59:74} can be mapped to two different areas, thus it is impossible to determine the exact position of the pick-up head, as far as its whereabouts is concerned, using the ATIP time code extracted from ATIP information; in other words, the exact position of the pick-up head is necessarily determined by an auxiliary means, such as the other conditions or data.

FIG. 5 is a diagram about the structure of subcode-Q data in mode 1. An ADR (address) of 1h indicates mode 1, wherein h denotes a hexadecimal number. A TNO (track number) of 00h indicates that the subcode-Q data is stored at the lead-in area disposed in the innermost tracks. On the contrary, if the TNO is not equal to 00h, the corresponding subcode-Q data may be stored in a program area or a lead-out area. Hence, it is possible to determine the current position of the pick-up head by reading the information of the subcode-Q data with a logic program executed during tracking.

According to the way they are burned, optical disks are divided into two types, namely single-session and multisession, as shown in FIGS. 6(a) and 6(b). A single-session optical disk 61 can be written once only and thus its data structure is simple; as a result, a TNO of 00h indicates that the subcode-Q data is stored in the lead-in area disposed in the innermost tracks. However, as for a multi-session optical disk 62, it is impossible to determine whether the pick-up head is currently located in a lead-in area (LI) between two program areas (PA) or in the innermost lead-in area (LI), even if the TNO equals 00h.

In general, predetermined functions of an optical disk drive, such as reading recorded data, writing data, reading data of a TOC (table of contents) from a lead-in area, and reading data of PMA, are achieved by the execution of various procedures which depend on the need, as far as the operation and application of the optical disk are concerned. However, for whatever functions to be executed, a seeking-and-tracking servo control circuit is always called first to move the pick-up as long as the functions attempt to read/write data from/to the optical disk. After the pick-up head moves to a target area, it executes extracting or writing data from or to the target area through following tracks. The mechanism of seeking is that the seeking-and-tracking servo control circuit reads the present address (acquired by means of the ATIP time code or the subcode-Q data) to confirm the "current position" first after a caller, such as a function which is attempting to read the data stored at the target position, gives a command of getting to a "target position"; then, the jumping direction and distance crossing the track direction are calculated in the light of the relationship between the current position and the target position, and the jumping action is executed in accordance with the result of the calculation. Track is locked again when the jumping action is done, though it entails reading the present address once again in order to confirm whether the pick-up head reaches the target area. If the arrival of the pick-up head at the target area is confirmed, the seeking action ends; otherwise, the seeking action continues in the light of the relationship between the current position and the target position until the pick-up head reaches the predetermined target area.

In fact, the optical storage device is unable to determine the current position solely by means of the ATIP time code or the subcode-Q data, as it is still necessary to set an area flag that indicates whether the position is or not in a specified area for determining some positions which correspond to overlapped time codes. Hence, the data of the area flag have to be checked out or reset whenever a different application procedure is executed, and auxiliary conditions are continually renewed and judged in the light of variations in the positions of the pick-up head predicted by individual application procedures. Hence, program maintenance is difficult, while omissions are common, especially that the movements of pick-up head are different and complex for many kinds of purposes and operation sequences for optical devices; as a result, any ensuing judgment is indefinite. Furthermore, the complicated examination and configuration which are taking place in the area flag and auxiliary conditions inevitably decrease the execution efficiency of the entire system, not to mention that such an additional confirmation program has not been applied to all optical disks with different formats yet.

SUMMARY OF THE INVENTION

The primary objective of the present invention is to provide a method and an apparatus for determining the position of a pick-up head, wherein the current position of the pick-up head is accurately determined in the light of detected signals or information relating to the linear velocity or angular velocity of the pick-up head at a certain place on an optical disk.

The second objective of the present invention is to provide a method for determining the current position of the pick-up head in the light of absolute conditions, without adding position determining auxiliary conditions or programs to various procedures. As a result, logical judgment mistakes are unlikely to happen, while system execution efficiency of the optical storage device increases.

In order to achieve the objective, the present invention discloses a method and an apparatus for determining the position of a pick-up head, and it involves retrieving the respective signals or information relating to the linear velocity and angular velocity of the pick-up head at a certain place on the optical disk, and then calculating the ratio of the obtained parameter of the linear velocity to the obtained parameter of the angular velocity. Since the ratio is linearly correlated with the distance between the pick-up head and the center of the optical disk, the absolute position of the pick-up head can be determined, as far as its whereabouts is concerned.

If the optical disk rotates at a constant linear velocity mode, that is, the linear velocity relative to the pick-up head of the position where the pick-up is on the optical disk is always the same throughout, the absolute position of the pick-up head can be determined in the light of the signals or information relating to the angular velocity of the pick-up head, as far as its whereabouts is concerned.

If the optical disk rotates at a constant angular velocity mode, that is, the optical disk rotates at the same angular velocity throughout, the absolute position of the pick-up head can be determined in the light of the signals or information relating to the linear velocity of the pick-up head, as far as its whereabouts is concerned.

BRIEF DESCRIPTION OF THE DRAWINGS

The invention will be described according to the appended drawings in which:

FIG. 5 is a diagram about the structure of subcode-Q data in mode 1;

FIG. 6(a) is a schematic diagram illustrating the scheme of a single-session optical disk;

FIG. 6(b) is a schematic diagram illustrating the scheme of a multi-session optical disk;

PREFERRED EMBODIMENT OF THE PRESENT INVENTION

Figures 1, 2:
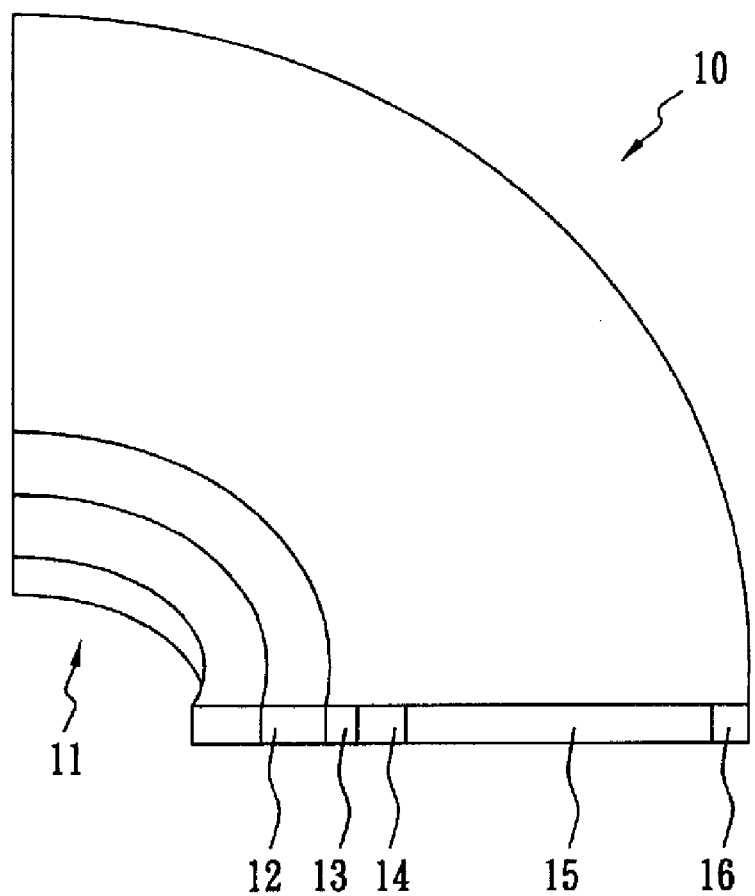
FIG. 1 is a schematic diagram illustrating the information area structure of a quarter of a conventional optical storage medium.
FIG. 2 is a diagram illustrating the scheme of ATIP data.
Figure 3:
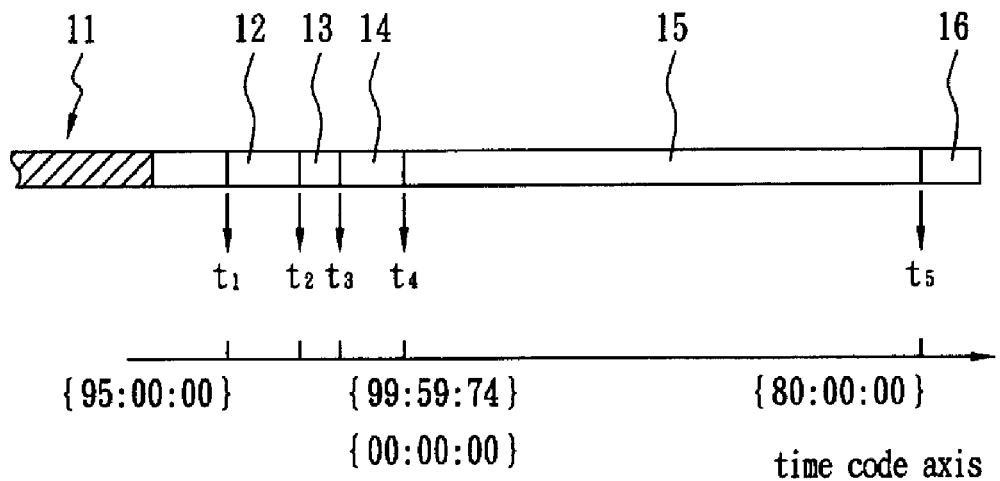
FIG. 3 is a diagram illustrating the corresponding relationship between an information area and an ATIP time code.
Figure 4:
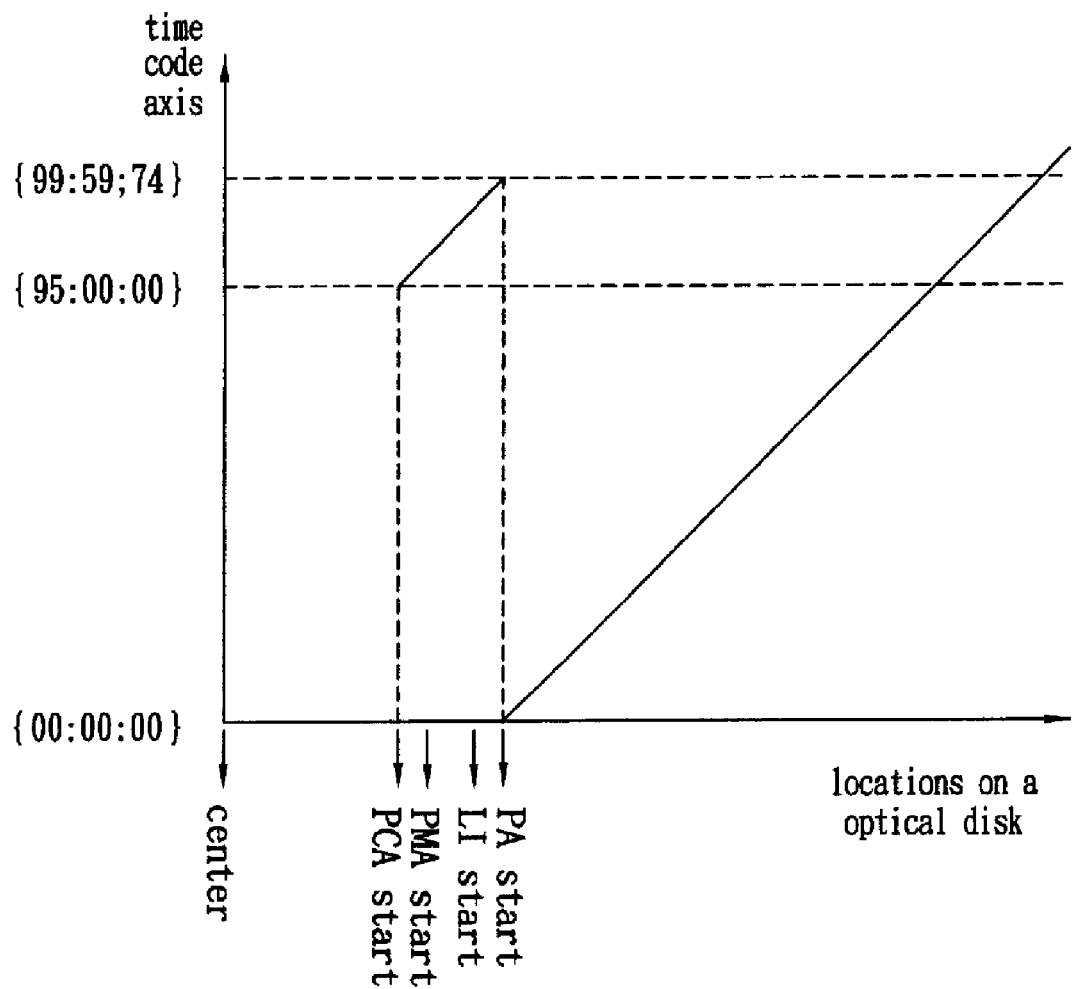
FIG. 4 is a graph of corresponding relationships between the program area of an optical disk and ATIP time code.
Figure 7A:
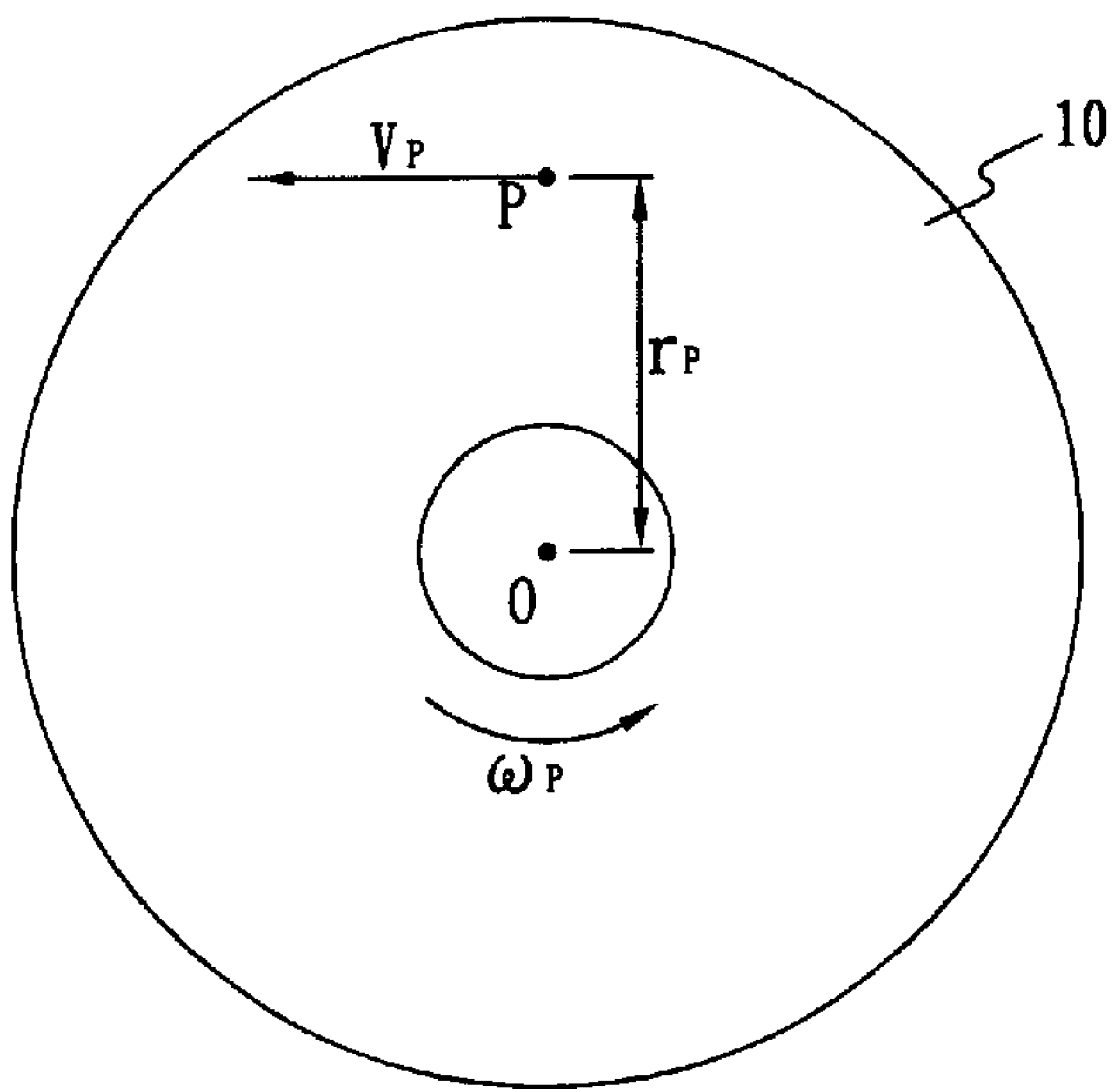
FIG. 7(a) is a schematic diagram illustrating a light spot from an optical pick-up head focused on an optical disk.

FIG. 7(a) is a schematic diagram illustrating a light spot from an optical pick-up head focused on an optical disk. The light spot of the pick-up head is focused on a point P of the optical disk 10, and $V_P$ denotes the linear velocity at the point P, whereas $\omega_P$ denotes the angular velocity of the optical disk 10. The linear velocity $V_P$ and the angular velocity cop are known for the optical storage device, thus the distance $\omega_P$ between the center O of the optical disk 10 and the point P is obtained from the following equation:

$$V_P = r_P \omega_P \Rightarrow r_P = \frac{V_P}{\omega_P},$$

where the linear velocity $V_P$ is figured out, using a wobble signal or an EFM signal, while the angular velocity $\omega_P$ is directly derived from the rotation speed of a spindle motor. Obviously, in the present embodiment, the absolute position of the pick-up head can be figured out once the area of the current position is determined by means of $r_P$, without identifying the rotation mode of the spindle motor. In addition, it is feasible to use any other equivalent signals or electric parameters relating to the angular velocity as input signal—for example an input/output voltage or a current for the control of spindle rotation speed or frequency.

Figure 7B:
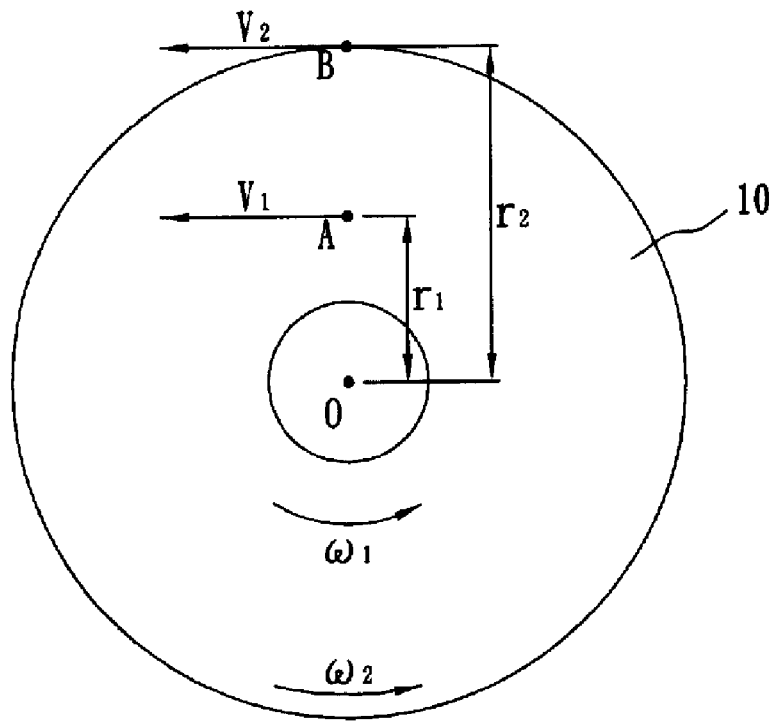
FIG. 7(b) is a schematic diagram illustrating how an optical disk rotates at a constant linear velocity (CLV) mode.

FIG. 7(b) is a schematic diagram illustrating how an optical disk rotates at a constant linear velocity (CLV) mode. Where the light spot of the pick-up head is focused on a point A of the optical disk 10, $V_1$ denotes the linear velocity at the point A, and $\omega_1$ denotes the angular velocity of the optical disk 10 at the point A. Where the light spot of the pick-up head is focused on a point B in the outermost tracks of the optical disk 10, $V_2$ denotes the linear velocity at the point B, and $\omega_2$ denotes the angular velocity of the optical disk 10 at the point B. The distances between the center O of the optical disk 10 and the points A and B are denoted by $r_1$ and $r_2$, respectively. As a result, with the constant linear velocity, the following equations are obtained:

$$r_1 \omega_1 = r_2 \omega_2 \Rightarrow r_1 = r_2 \frac{\omega_2}{\omega_1},$$

where $r_2$, $\omega_1$ and $\omega_2$ are known, thus $r_1$ is obtained and then used for determining the absolute position of the whereabouts of the pick-up head.

Figure 7C:
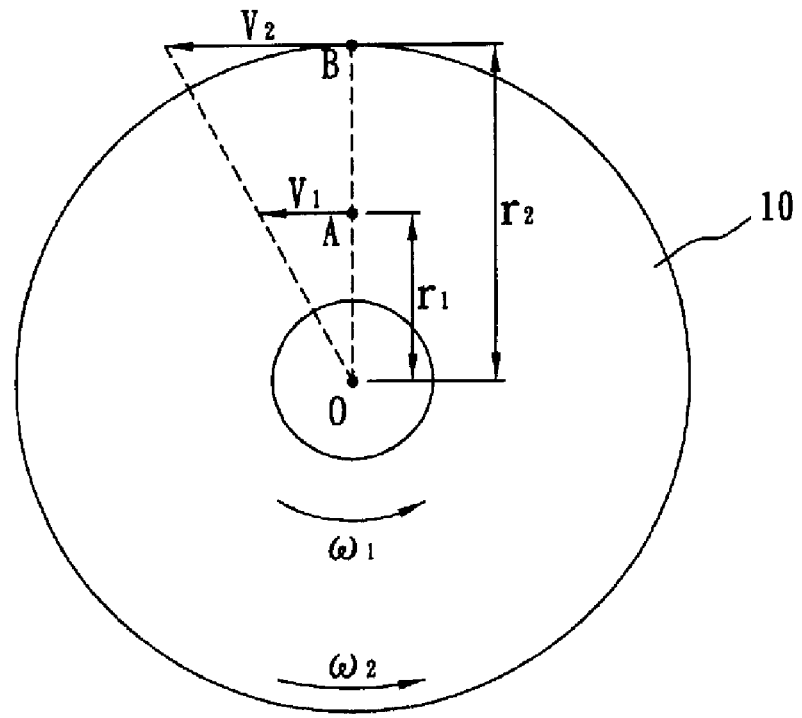
FIG. 7(c) is a schematic diagram illustrating how an optical disk rotates at a constant angular velocity (CAV) mode.

FIG. 7(c) is a schematic diagram illustrating how an optical disk rotates at a constant angular velocity (CAV) mode. Where the light spot of the pick-up head is focused on a point A of the optical disk 10, $V_1$ denotes the linear velocity at the point A, and $\omega_1$ denotes the angular velocity of the optical disk 10 at the point A. Where the light spot of the pick-up head is focused on a point B in the outermost tracks of the optical disk 10, $V_2$ denotes the linear velocity at the point B, and $\omega_2$ denotes the angular velocity of the optical disk 10 at the point B. The distances between the center O of the optical disk 10 and the points A and B are denoted by $r_1$ and $r_2$, respectively. As a result, with the constant angular velocity, the following equations are obtained:

$$\frac{V_1}{r_1} = \frac{V_2}{r_2} \Rightarrow r_1 = r_2 \frac{V_1}{V_2},$$

where $r_2$, $V_1$ and $V_2$ are known, thus $r_1$ is obtained and then used for determining the absolute position of the whereabouts of the pick-up head.

Figure 8:
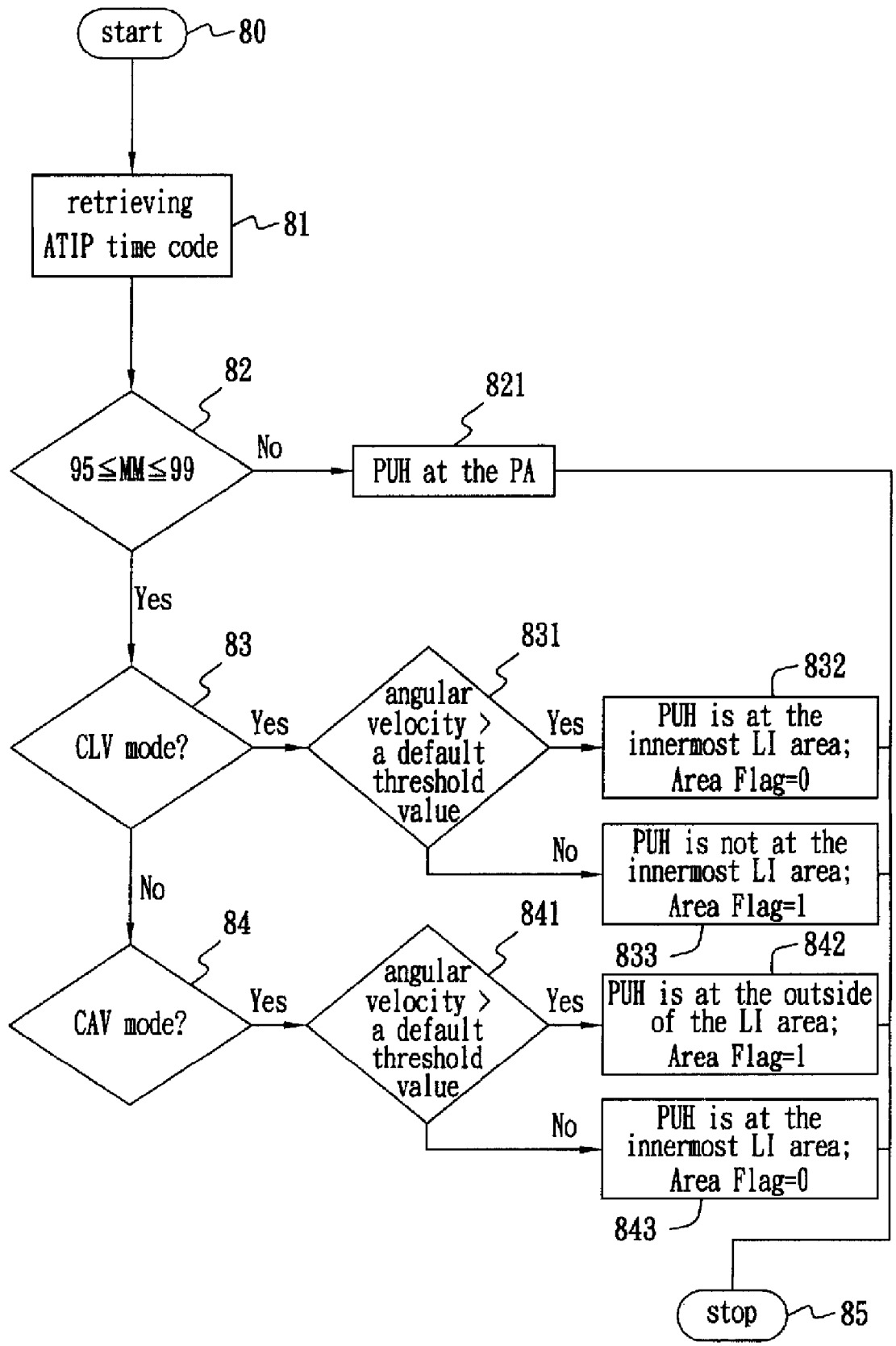
FIGS. 8-8(c) are flowcharts about how the current position of a pick-up head is determined in accordance with the present invention.

FIG. 8 is a flowchart about how the current position of a pick-up head is determined in accordance with the present invention. Referring to Step 81, the pick-up head retrieves ATIP time codes. Then, Step 82 involves confirming whether the figure MM, which stands for the minute in the time code, ranges between the 95th minute and the 99th minute. The present embodiment is about the problem of overlapped time codes commonly seen in high capacity (HC) optical disks, such as HC-CDR. However, the present invention is not limited to the scope of overlapped time illustrated in the present embodiment, wherein the lower limit of overlapped time may be greater or less than the 95th minute. If the figure MM, which stands for the minute in the time code, does not lie between the 95th and the 99th minute, it means that the pick-up head is currently located at a program area (PA), as shown in Step 821; otherwise, it is necessary to check and see whether the rotation mode of the optical storage device is the constant linear velocity (CLV) mode or the constant angular velocity (CAV) mode, as shown in Steps 83 and 84. Once it is confirmed that the rotation mode is the constant linear velocity mode, it is necessary to further check and see whether the current angular velocity is greater than a predetermined threshold value, as shown in Step 831. If the aforesaid condition is satisfied, it means that the pick-up head is located at a lead-in area disposed in the innermost tracks and it is necessary to set an area flag to 0, as shown in Step 832. If, however, the angular velocity is less than a predetermined threshold value, it means that the pick-up head is not located at a lead-in area disposed in the innermost tracks and it is necessary to set the area flag to 1, as shown in Step 833.

Once it is confirmed that the rotation mode of the optical storage device is the constant angular velocity mode, it is necessary to further check and see whether the current linear velocity is greater than a predetermined threshold value, as shown in Step 841. If the aforesaid condition is satisfied, it means that the pick-up head is located at the outer tracks of the optical disk and it is necessary to set the AreaFlag to 1, as shown in Step 842. If, however, the linear velocity is less than a predetermined threshold value, it means that the pick-up head is located at a lead-in area disposed in the innermost tracks and it is necessary to set the area flag to 0, as shown in Step 843. The rotation mode of the optical disks for an optical storage device is either the constant linear velocity (CLV) mode or the constant angular velocity (CAV) mode. If the rotation mode is confirmed before the ATIP time code is retrieved to determine the current position of the pick-up head, then the aforesaid Steps 83 and 84 to judge the rotation mode are skipped, and the determination of the corresponding linear velocity or angular velocity and the predetermined threshold value is directly executed.

Figure 8A:
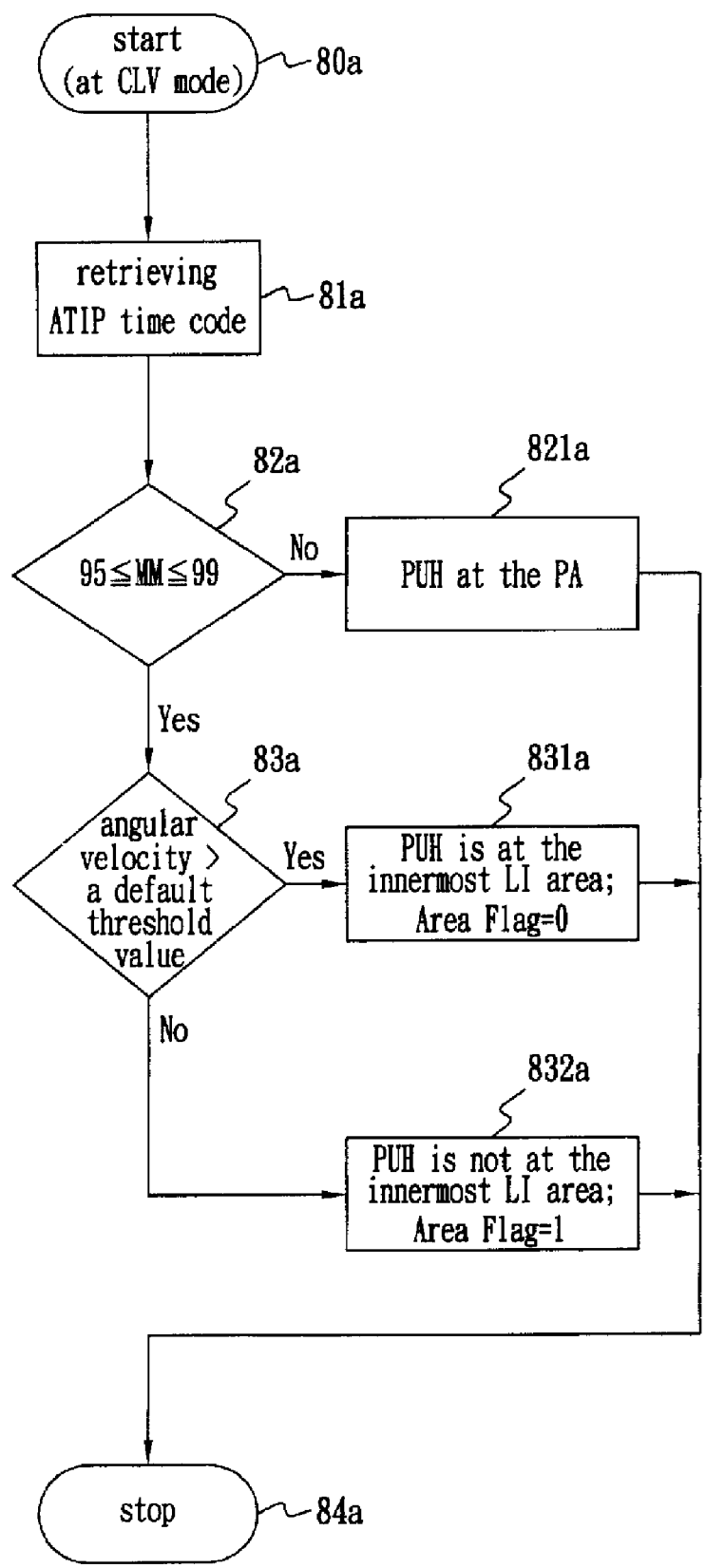

Referring to FIG. 8(a), if, at a confirmed constant linear velocity mode, the figure MM, which stands for minute in the time code, ranges between the 95th minute and the 99th minute, it is necessary to check and see directly whether the angular velocity is greater than a predetermined threshold value in order to determine whether the pick-up head is located at a lead-in area disposed in the innermost tracks, as shown in Step 83a and Step 831a or 832a.

Figure 8B:
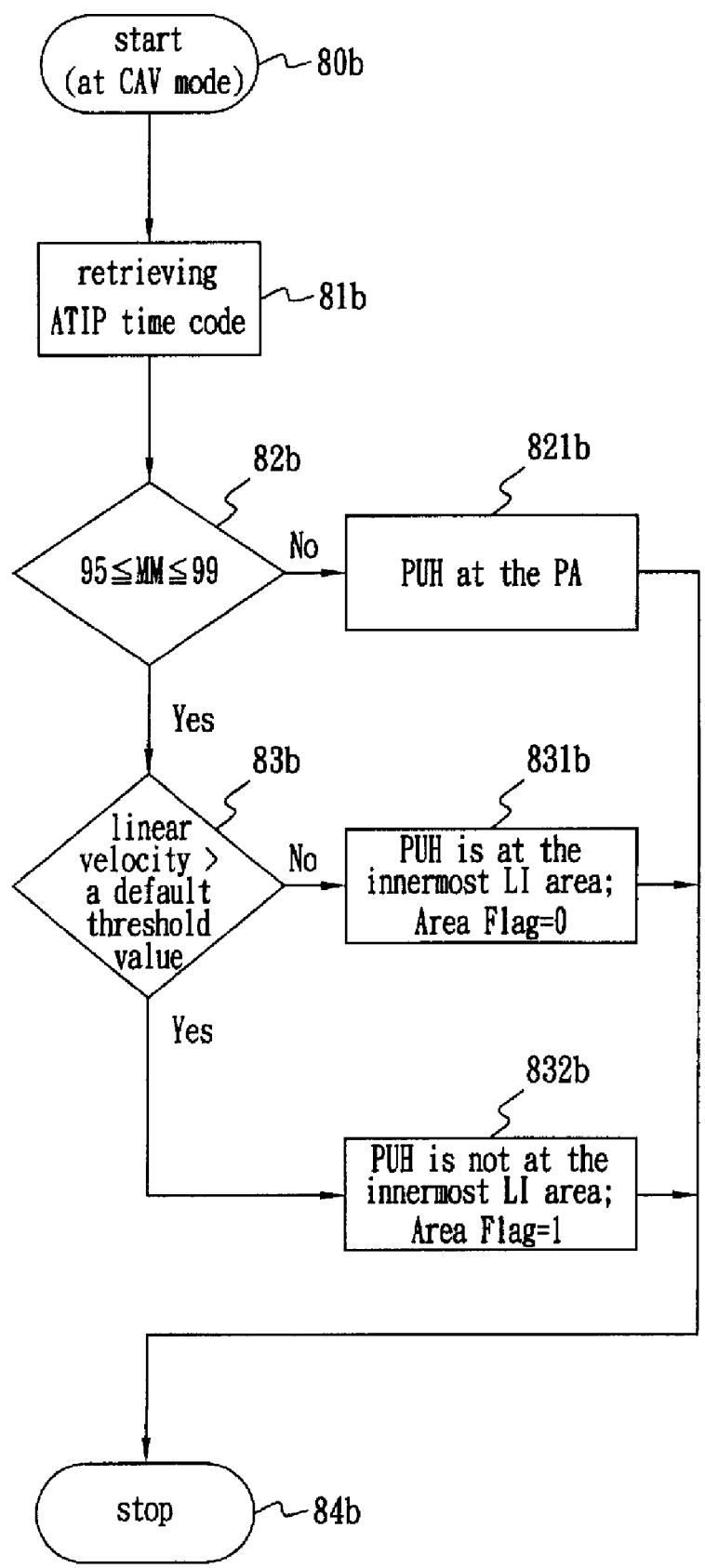

Referring to FIG. 8(b), if, at a confirmed constant angular velocity mode, the figure MM, which stands for minute in the time code, ranges between the 95th minute and the 99th minute, it is necessary to check and see directly whether the linear velocity is greater than a predetermined threshold value in order to determine whether the pick-up head is located at a lead-in area disposed in the innermost tracks, as shown in Step 83b and Step 831b or 832b.

Figure 8C:
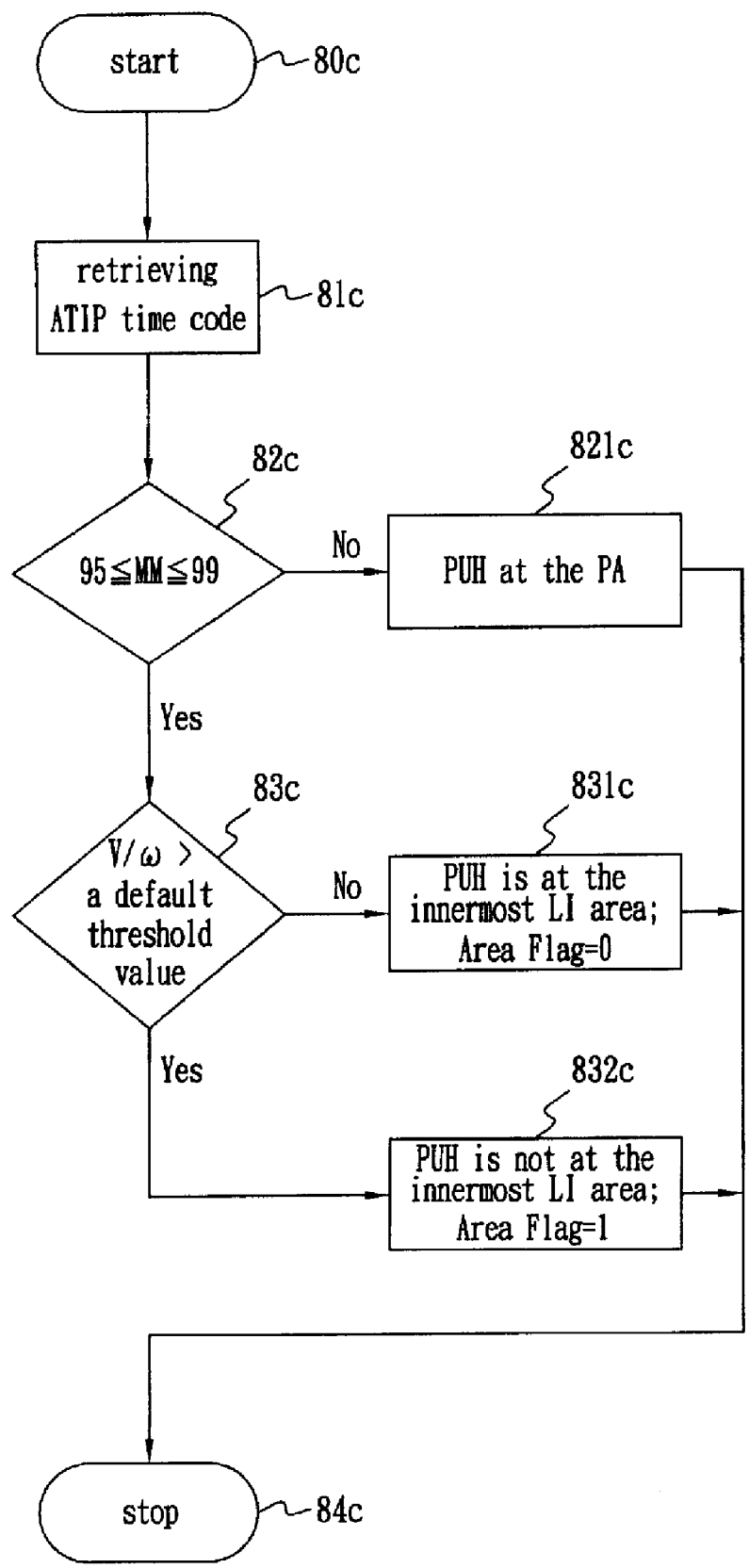

The above-mentioned embodiments refer to the method for correctly acquiring related linear velocity signals by means of the pick-up head of an optical storage device on condition that the optical disk rotates steadily. FIG. 8(c) is a flowchart of another method for determining the current position of a pick-up head in accordance with the present invention. An optical storage device can obtain the signals or information of the linear velocity of its pick-up head whenever the pick-up head is at a track locking state and thus confirmation of steady rotation is unnecessary; if this is the case, the acquired real-time linear velocity is divided by the immediate angular velocity to directly calculate the radial ratio of the current position of the pick-up head without any necessity of determining the current rotation mode of the optical storage device. Referring to Step 81c, the pick-up head retrieves the ATIP time code. Then, Step 82c involves confirming whether the figure MM, which stands for minute in the timing code, ranges between the 95th minute and the 99th minute. Here the present embodiment is about the problem of overlapped time codes commonly seen in high capacity (HC) optical disks, such as HC-CDR. However, the present invention is not limited to the scope of overlapped time illustrated in the present embodiment, wherein the lower limit of overlapped time may be greater or less than the 95th minute. If the figure MM, which stands for minute in the timing code, does not lie between the 95th minute and the 99th minute, it means that the pick-up head is located at a program area, as shown in Step 821c; otherwise, it is necessary to check and see whether the linear velocity to angular velocity ratio is greater than a predetermined threshold value, as shown in Step 83c. If the aforesaid condition is satisfied, it means that the pick-up head is located at the outside tracks of the optical disk and it is necessary to set an area flag to 1, as shown in Step 832c. If, however, the linear velocity is less than a predetermined threshold value, it means that the pick-up head is located at a lead-in area disposed in the innermost tracks and it is necessary to set the area flag to 0, as shown in Step 831c.

Figure 9:
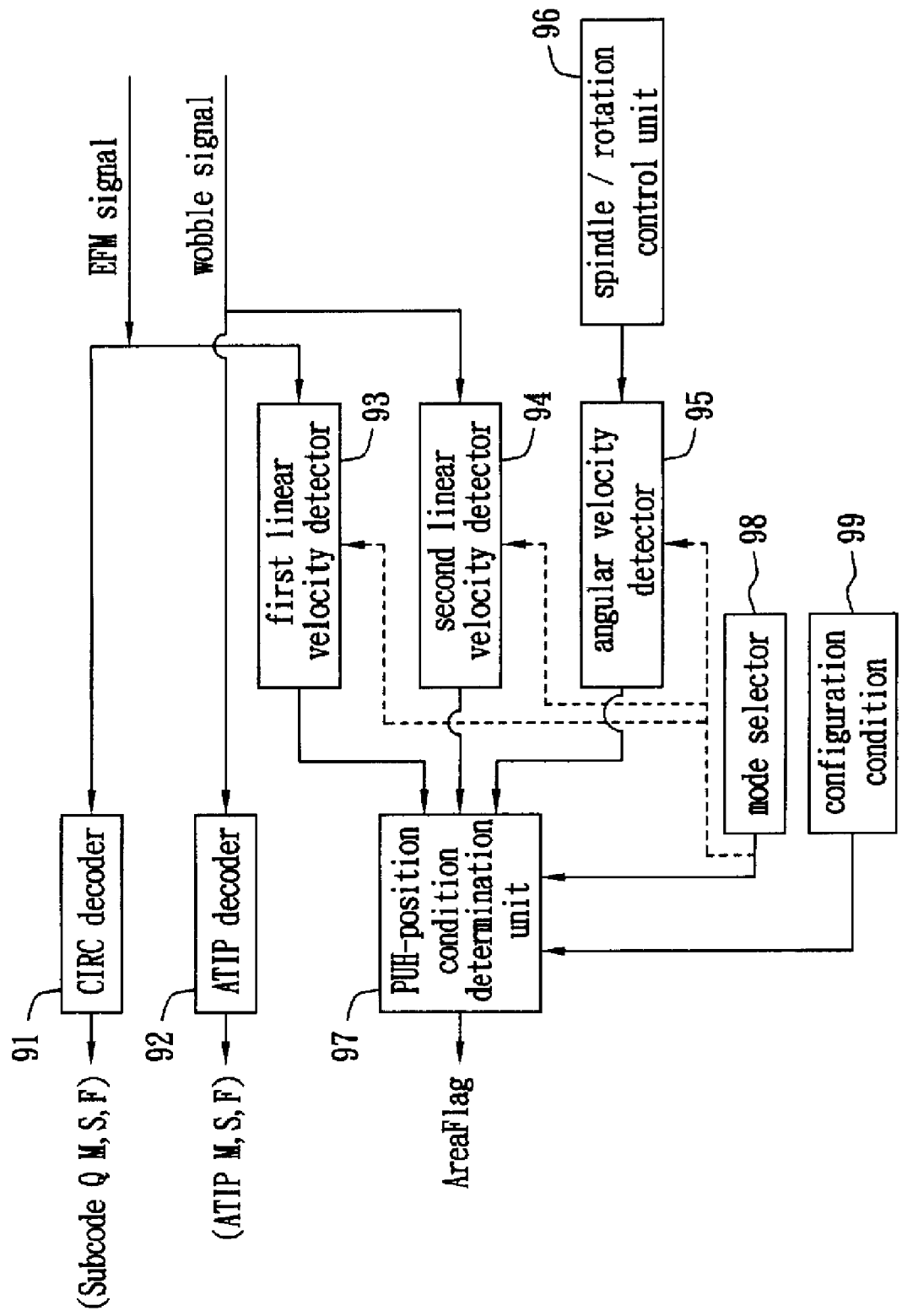
FIG. 9 is a functional block diagram of the apparatus for determining the current position of a pick-up head in accordance with the present invention.

FIG. 9 is a functional diagram of the apparatus for determining the current position of a pick-up head in accordance with the present invention. The apparatus employs a wobble signal or an EFM signal to determine the current position of a pick-up head. The EFM signal is processed by a cross interleaved Reed-Solomon coding (CIRC) decoder 91 to extract the minute M, the second S and the frame F from the subcode-Q data. Meanwhile, the EFM signal is input to a first linear velocity detector 93. Then, the first linear velocity detector 93 acquires the current value of linear velocity and sends the value to the position condition determination unit 97 of the pick-up head. The wobble signal is processed by an ATIP decoder 92 to extract the minute M, the second S and the frame F from the ATIP time code. Furthermore, the wobble signal is input to a second linear velocity detector 94. Then, the second linear velocity detector 94 acquires the current value of linear velocity and sends the value to the position condition determination unit 97 of the pick-up head.

A signal relating to the angular velocity is input to an angular velocity detector 95 by a spindle/rotation control unit 96, and similarly the angular velocity detector 95 acquires the current value of linear velocity and sends the value to the position condition determination unit 97 of the pick-up head. Lastly, the position condition determination unit 97 of the pick-up head determines whether the linear velocity and angular velocity are currently greater than their respective corresponding predetermined threshold values, and then it further outputs a position area flag as a basis for any tracking actions carried out by the system. Moreover, the servo control system of the optical storage device identifies the current mode of mode selector 98. If the constant linear velocity mode is on, the angular velocity detector 95 is started. On the contrary, if the constant angular velocity mode is on, either the first linear velocity detector 93 or the second linear velocity detector 94 is started. An optical storage device can obtain the linear velocity signals of its pick-up head whenever the pick-up head is at a track locking state and thus confirmation of steady rotation is unnecessary; if this is the case, the determination unit 97 calculates the current linear velocity to angular velocity ratio and determines whether the ratio is greater than a corresponding predetermined threshold value, and then it further outputs the position area flag as a basis for any tracking actions carried out by the system. Conditions used by the position condition determination unit 97 of the pick-up head may also be set in accordance with external configuration conditions 99; This predetermined threshold value may be changed according to the storage formats or specifications of optical disks in order to determine the current position of the pick-up head.

To sum up, the present invention has the following advantages, compared to the conventional art:

It does not entail adding any position determining auxiliary conditions about the position of the pick-up head or programs to various procedures, but instead involves using an absolute condition for judging the current position of a pick-up head, or, in other words, the position of a pick-up head is correctly confirmed against an absolute condition. The present invention is free of judgment logic mistakes, and its programs are simple and therefore easy to maintain, compared with the complicated steps of the conventional art.

As regards overlapped time codes for information areas of an optical disk, the positions of related areas in inside tracks are very different from those in outside tracks; they are away from such an extent that individual corresponding radial distances exceed three centimeters, or a radial ratio is greater than two. Hence, there is an extremely great discrepancy in angular velocity at the constant linear velocity mode as well as in linear velocity at the constant angular velocity mode, thus it is not necessary for parameters determined from retrieved signals or information of linear and angular velocity to be very precise in order to discriminate between an inside block and an outside block. Since acquisition of equivalent signals or information for angular velocity or linear velocity is an indispensable function of existing optical storage devices or optical disk systems, the present invention can be implemented without the addition of any hardware signal sensing function to the existing optical storage devices or optical disk drives.

Since it takes considerable amount of time for certain signals or parameters to give responses of valid values, not only is the system time-inefficient, but also misjudgment is inevitable, if reading and judgment are directly carried out with the firmware of the system. According to the present invention, with hardware, signals or parameters are continuously monitored and findings of the judgment are produced, thus the entire system is not kept waiting while it is working; instead, the findings of judgment carried out by the system can be directly retrieved so as to further increase the efficiency of the system.

The above-described embodiments of the present invention are intended to be illustrative only. Numerous alternative embodiments may be devised by persons skilled in the art without departing from the scope of the following claims.

What is climed as new and desired to be protected by Letters Patent of the United States:

1. A method for determining the position of a pick-up head, comprising the steps of:
    retrieving parameter values relating to a linear velocity and an angular velocity of the pick-up head at a current position on an optical storage medium;
    calculating a ratio of the parameter value of the linear velocity to the parameter of the angular velocity; and
    determining the current position of the pick-up head on the optical storage medium according to the ratio.

2. The method for determining the position of a pick-up head of claim 1, wherein the parameter value relating to the linear velocity is retrieved from a wobble signal stored in pre-grooves of the optical storage medium or an EFM signal stored in tracks of the optical storage medium.

3. The method for determining the position of a pick-up head of claim 1, wherein the parameter value relating to the angular velocity is retrieved from a spindle rotation velocity, a spindle rotation frequency, or an input/output voltage or a current for controlling the spindle rotation velocity.

4. A method for determining the position of a pick-up head, the method comprising:
retreving parameter values relating to a linear velocity and an angular velocity of the pick-up head at a current position on an optical storage medium;
calculating a ratio of the parameter value of the linear velocity to the parameter of the angular velocity; and
determining the current position of the pick-up on the optical storage medium according to the ratio,
wherein the steps start to be executed if two different areas on the optical storage medium have overlapped ATIP time codes or the ATIP time codes are indefinite for determining the current position of the optical pick-up head.

5. A method for determining the position of a pick-up head, comprising the steps of:
retrieving a parameter value relating to the angular velocity of the pick-up head at a current position on a optical storage medium if the optical storage medium holds at constant linear velocity mode; and
determining the current position of the pick-up head on the optical storage medium according to the parameter value.

6. The method for determining the position of a pick-up head of claim 5, wherein the parameter value relating to the angular velocity is retrieved from a spindle rotation velocity, a spindle rotation frequency, or an input/output voltage or a current for controlling the spindle rotation velocity.

7. The method for determining the position of a pick-up head of claim 5, wherein the parameter value relating to the angular velocity is compared with a predetermined threshold value to determine that the pick-up head is positioned at the lead-in area or the outside of the lead-in area of the optical storage medium.

8. A method for determining the position of a pick-up head, the method comprising:
retrieving a value relating to the angular velocity of the pick-up head at a current position on a optical storage medium if the optical storage medium holds at constant linear velocity mode; and
determining the current position of the pick-up head on the optical storage medium according to the parameter value,
wherein the steps start to be executed if two different areas on the optical storage medium have overlapped ATIP time codes or the ATIP time codes are indefinite for determining the current position of the optical pick-up head.

9. A method for determining the position of a pick-up head, comprising the steps of:
retrieving a parameter value relating to a linear velocity of the pick-up head at a current position on a optical storage medium if the optical storage medium holds at a constant angular velocity mode; and
determining the current position of the pick-up head on the optical storage medium according to the parameter value.

10. The method for determining the position of a pick-up head of claim 9, wherein the parameter value relating to the linear velocity is retrieved from a wobble signal stored in pre-grooves of the optical storage medium or an EFM signal stored in tracks of the optical storage medium.

11. The method for determining the position of a pick-up head of claim 9, wherein the parameter value relating to the linear velocity is compared with a given threshold value to determine if the pick-up head is positioned at a lead-in area of the optical storage medium.

12. A method for determining the position of a pick-up head, the method comprising:
retrieving a parameter value relating to a linear velocity of the pick-up head at a current position on a optical storage medium if the optical storage medium holds at a constant angular velocity mode; and
determining the current position of the pick-up head on the optical storage medium according to the parameter value,
wherein the steps start to be executed if two different areas on the optical storage medium have overlapped ATIP time codes or the ATIP time codes are indefinite for determining the current position of the pick-up head.

13. An apparatus for determining the position of a pick-up head on an optical storage medium, comprising:
a linear velocity detector for converting a parameter value relating to a linear velocity of the optical storage medium into a linear velocity value;
an angular velocity detector for converting a parameter value relating to an angular velocity of the optical storage medium into a angular velocity value; and
a position condition determination unit for comparing the linear velocity value with a predetermined threshold value or comparing the angular velocity with the predetermined threshold value so as to determine the current position of the pick-up head.

14. An apparatus for determining the position of a pick-up head on an optical storage medium, comprising:
a linear velocity detector for converting a parameter value relating to a linear velocity of the optical storage medium into a linear velocity value;
an angular velocity detector for converting a parameter value relating to an angular velocity of the optical storage medium into an angular velocity value; and
a position condition determination unit for calculating a ratio of the linear velocity value to the angular velocity value, and comparing the ratio with a predetermined threshold value so as to determine the current position of the pick-up head.

15. The apparatus for determining the position of a pick-up head of claim 13 or claim 14, wherein the linear velocity detector converts a wobble signal from pre-grooves of the optical storage medium into the linear velocity value.

16. The apparatus for determining the position of a pick-up head of claim 13 or claim 14, wherein the linear velocity detector converts an EFM signal stored in tracks of the optical storage medium into the linear velocity value.

17. The apparatus for determining the position of a pick-up head of claim 13 or claim 14, wherein the angular velocity detector converts a spindle rotation velocity, or an input/output voltage or a current for controlling the spindle rotation velocity into the angular velocity value.

18. The apparatus for determining the position of a pick-up head of claim 13 or claim 14, wherein the position condition determination unit confirms the current rotation mode of the optical storage medium by means of a mode selector so as to choose one of the linear velocity value and the angular velocity value as a comparison basis.

19. The apparatus for determining the position of a pick-up head of claim 13 or claim 14, wherein the position condition determination unit chooses one of the linear velocity value and the angular velocity value as a comparison basis according to the ratio of the linear velocity value to the angular velocity value.

* * * * *